(12) United States Patent
Baba et al.

(10) Patent No.: US 11,448,729 B2
(45) Date of Patent: Sep. 20, 2022

(54) OPTICAL DEFLECTION DEVICE AND LIDAR APPARATUS

(71) Applicants: NATIONAL UNIVERSITY CORPORATION YOKOHAMA NATIONAL UNIVERSITY, Yokohama (JP); TOKYO INSTITUTE OF TECHNOLOGY, Tokyo (JP)

(72) Inventors: Toshihiko Baba, Yokohama (JP); Nobuhiko Nishiyama, Tokyo (JP)

(73) Assignees: NATIONAL UNIVERSITY CORPORATION YOKOHAMA NATIONAL UNIVERSITY, Yokohama (JP); TOKYO INSTITUTE OF TECHNOLOGY, Tokyo (JP)

( * ) Notice: Subject to any disclaimer, the term of this patent is extended or adjusted under 35 U.S.C. 154(b) by 845 days.

(21) Appl. No.: 16/314,292

(22) PCT Filed: Jun. 28, 2017

(86) PCT No.: PCT/JP2017/023747
§ 371 (c)(1),
(2) Date: Dec. 28, 2018

(87) PCT Pub. No.: WO2018/003852
PCT Pub. Date: Jan. 4, 2018

(65) Prior Publication Data
US 2019/0204419 A1      Jul. 4, 2019

(30) Foreign Application Priority Data

Jun. 30, 2016   (JP) .................................. 2016-130877

(51) Int. Cl.
*G01S 7/481* (2006.01)
*G02B 6/124* (2006.01)
(Continued)

(52) U.S. Cl.
CPC ............. *G01S 7/4811* (2013.01); *G01S 7/481* (2013.01); *G01S 7/4817* (2013.01); *G01S 17/89* (2013.01);
(Continued)

(58) Field of Classification Search
CPC ........ G01S 7/4811; G01S 17/89; G01S 7/481; G01S 7/4817; G01S 7/4815;
(Continued)

(56) References Cited

U.S. PATENT DOCUMENTS

2009/0136181 A1   5/2009   Vollmer et al.
2011/0028346 A1   2/2011   Chakravarty et al.

FOREIGN PATENT DOCUMENTS

| EP | 3407128 A1 | 11/2018 |
| JP | 5662266 B2 | 1/2015 |
| WO | 2017126386 A1 | 7/2017 |

OTHER PUBLICATIONS

Gu, X. et al., "Giant and high-resolution beam steering using slow-light waveguide amplifier," Optics Express, vol. 19, No. 23, Nov. 7, 2011, Available as Early as Oct. 26, 2011, 9 pages.

(Continued)

*Primary Examiner* — Daniel L Murphy
(74) *Attorney, Agent, or Firm* — McCoy Russell LLP

(57) ABSTRACT

In a light deflection device and a lidar device, a parallel operation can be realized with a simple constitution, so as to avoid enlargement or complication of a system. The reflection angle of the light deflection device depends on a wavelength and a refractive index, so that light beams with respective wavelengths different from each other are simultaneously and parallelly deflected in directions of deflection angles each defined by the wavelength and the refractive index. The light beams with the plural wavelengths different from each other are deflected at the different deflection (Continued)

angles each defined by each wavelength and the refractive index, so that they can be deflected simultaneously and parallelly. The plural deflected light beams can be distinguished from each other based on the difference in the wavelength and the deflection angle of the light, even in the simultaneous and parallel operation.

9 Claims, 12 Drawing Sheets

(51) Int. Cl.
*G01S 17/89* (2020.01)
*G02B 6/34* (2006.01)
*G02F 1/29* (2006.01)
*G02B 6/12* (2006.01)
*G02B 5/18* (2006.01)

(52) U.S. Cl.
CPC ............... *G02B 5/18* (2013.01); *G02B 6/12* (2013.01); *G02B 6/124* (2013.01); *G02B 6/34* (2013.01); *G02F 1/29* (2013.01)

(58) Field of Classification Search
CPC ......... G01S 7/4818; G02B 6/34; G02B 6/124; G02B 6/12; G02B 5/18; G02B 6/32; G02B 6/1225; G02B 6/29355; G02F 1/29; G02F 1/2955
USPC ........................................................ 356/4.01
See application file for complete search history.

(56) References Cited

OTHER PUBLICATIONS

Van Acoleyen, K. et al., "One-Dimensional Off-Chip Beam Steering and Shaping Using Optical Phased Arrays on Silicon-on-Insulator," Journal of Lightwave Technology, vol. 29, No. 23, Dec. 1, 2011, Available as Early as Oct. 13, 2011, 6 pages.
ISA Japan Patent Office, International Search Report Issued in Application No. PCT/JP2017/023747, Sep. 26, 2017, WIPO, 4 pages.

Fig. 2
(a)
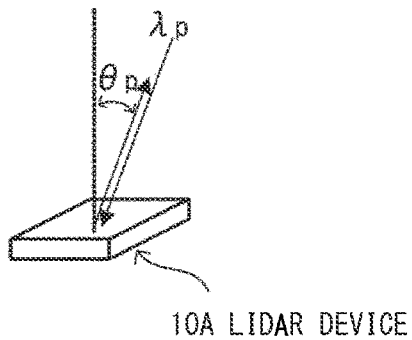
(b)
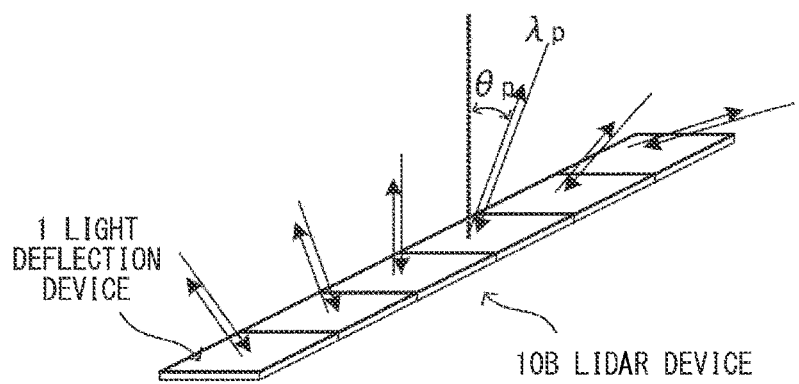
(c)
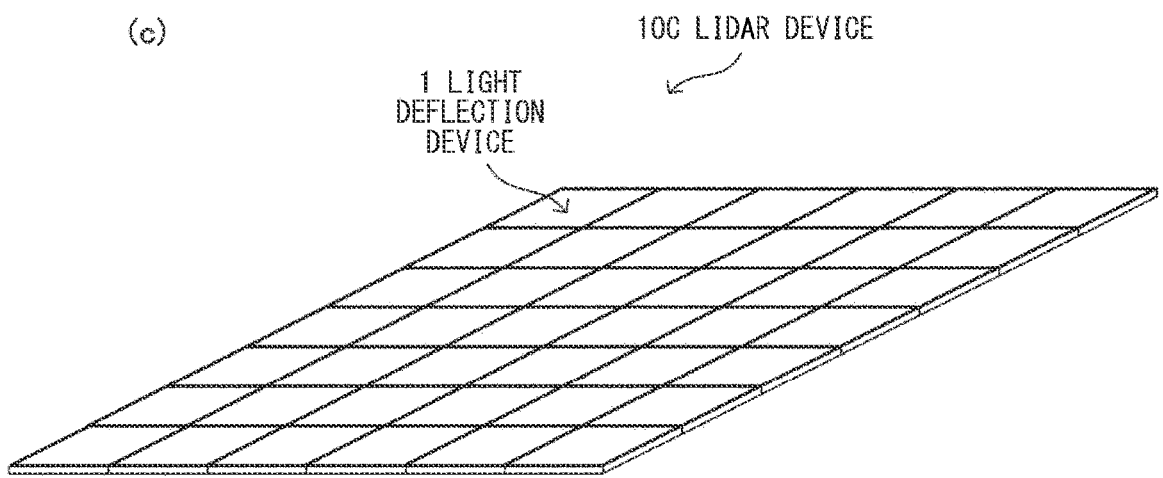

Fig. 3
(a)
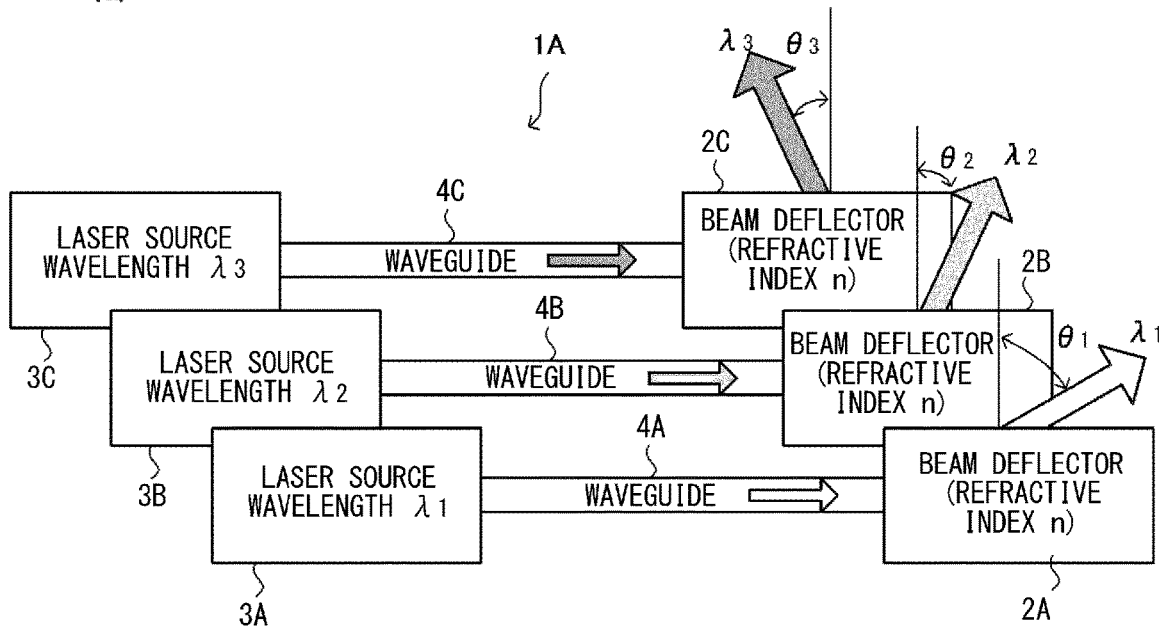
(b)
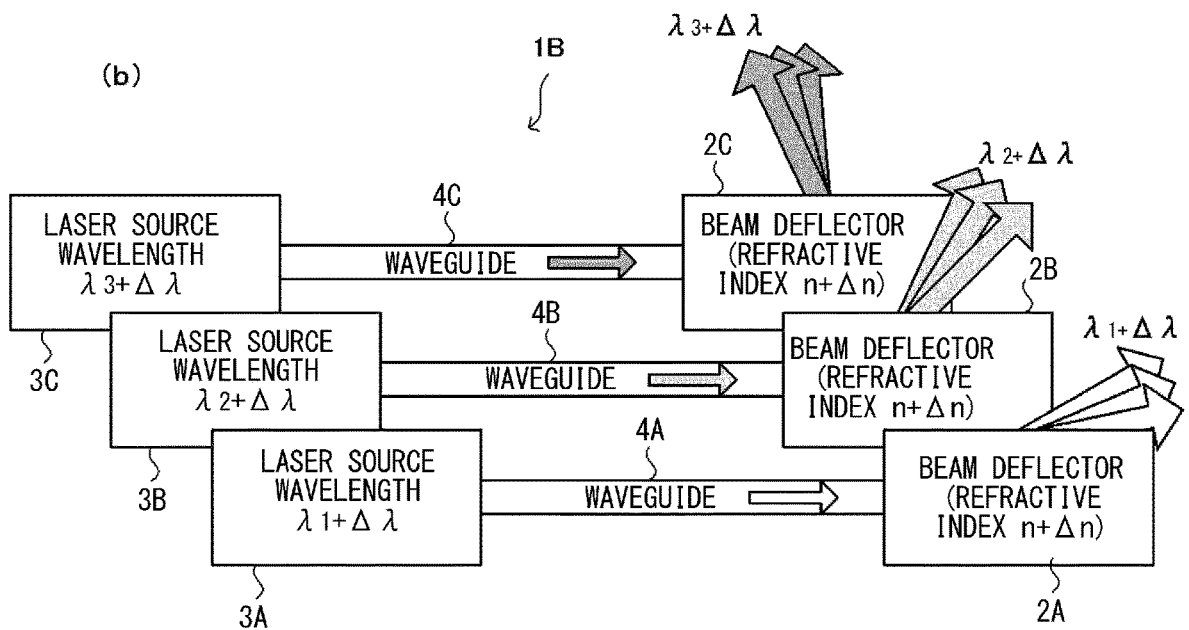

OPTICAL DEFLECTION DEVICE AND LIDAR APPARATUS

CROSS REFERENCE TO RELATED APPLICATIONS

The present application is a U.S. National Phase of International Patent Application Serial No. PCT/JP2017/023747 entitled "OPTICAL DEFLECTION DEVICE AND LIDAR APPARATUS," filed on Jun. 28, 2017. International Patent Application Serial No. PCT/JP2017/023747 claims priority to Japanese Patent Application No. 2016-130877, filed on Jun. 30, 2016. The entire contents of each of the above-mentioned applications are hereby incorporated by reference in their entirety for all purposes.

TECHNICAL FIELD

The present invention relates to a light deflection device for controlling a travelling direction of light, and a lidar device with the light deflection device.

BACKGROUND ART

In a field of a laser radar or lidar device (LIDAR (Light Detection and Ranging, Laser Imaging Detection and Ranging) device) (hereinafter referred to as lidar device), automatic driving of an automobile or three-dimensional map are being developed by laser measurement for obtaining a distance to a peripheral object as a two-dimensional image. Other fields in which the lidar device is used include a laser printer and a laser display.

The lidar device obtains information of a distance from a time difference and a frequency difference by radiating a light beam to an object and detecting reflected light reflected and returned by the object, and obtains wide-angle three-dimensional information by two-dimensionally scanning the light beam.

The light beam is scanned using a light deflection device. Conventionally, a mechanical light deflection device with a rotating polygon mirror is used. The light deflection device with the polygon mirror has such a problem that it becomes unstable in a vibrating mobile body like an automobile and has a short life. To solve this problem, a small integrated mirror using a micro-machine technique (MEMS technique) is being developed for a practical use. However, even the small integrated mirror using the MEMS technique has such a problem that it is still unstable in the mobile body, and a scanning speed is lower than that of a conventional mechanical light deflection device.

As a non-mechanical light deflection device for solving the problem of the mechanical light deflection device, a phase array and a leakage waveguide are being researched.

The phase array forms a light beam using interference of light from multiple light radiators integrated on a substrate. By adjusting phases of respective radiators, a beam can be formed in an arbitrary direction. (Non Patent Literature 1)

However, accuracy required for adjusting the phase is very high, and normally, it is difficult to satisfy the accuracy. Therefore, the light beam expands more than required, and only unclear information can be obtained, which is a problem.

A leakage waveguide type light deflection device radiates light propagating through a waveguide in an upward direction or a diagonal direction by a diffraction grating engraved on the waveguide and multi-layer membranes formed on upper and lower sides of the waveguide, can form sharp light beam by uniform radiation, and can scan the light beam by changing a wavelength of light and a refractive index of the waveguide. Also, when the device is operated with a wavelength near a condition that angle dispersion of the multi-layer membranes is large (a slow-light condition), sensitivity to the wavelength and the refractive index is increased, and a beam scan angle can be made large. (Non Patent Literature 2)

In a waveguide with a diffraction grating, light is gradually leaked from the waveguide by a weak diffraction grating to form the light beam, and the light beam can be scanned by a wavelength and a waveguide refractive index. (Patent Literature 1)

CITATION LIST

Patent Literature

Patent Literature 1: Japanese Patent No. 5662266

Non Patent Literature

Non Patent Literature 1: "One-Dimensional Off-Chip Beam Steering and Shaping Using Optical Phased Arrays on Silicon-on-Insulator" Karel Van Acoleyen, Katarzyna Komorowska, Wim Bogaert, Roel Baets, JOURNAL OF LIGHTWAVE TECHNOLOGY, VOL. 29, NO. 23, Dec. 1, 2011. Non Patent Literature 2: "Giant and high-resolution beam steering using slow-light waveguide amplifier" Xiaodong Gu, Toshikazu Shimada, and Fumio Koyama, 7 Nov. 2011/Vol. 19, No. 23/OPTICS EXPRESS 22683.

SUMMARY OF INVENTION

Technical Problem

In any of a mechanical light deflection device and a non-mechanical light deflection device, a lidar device makes light beam to collide with an object, and measure a distance based on its reflected light. For example, two kinds of methods, Time of Flight (TOF) method for measuring a delay time distance of reflection pulse by colliding pulse-like light with the object, and Frequency Modulation Continuous Wave (FMCW) method for measuring a distance from a difference frequency of reflected light and reference light by modulating a frequency of continuous light and colliding the light with the object are known. In any measuring method, once the light beam is collided with the object and the reflected light is received, information at one portion is first acquired. Therefore, to obtain the information on each pixel, at least a time for reciprocating to the object is required.

For example, when a lidar device is used as a sensor of an automobile or an outdoor robot, 150 m is considered as one example of a measurable distance. In this case, there is a reciprocating distance of 300 m between the lidar device and the object, and therefore, a time required for the light to reciprocate is 1 s.

In this time, when the number of pixels of a two-dimensional image of a light deflection device of the lidar device is 1,000,000, to acquire the information on one frame of an image, is (=1,000,000 pixels×1 μs) is required and a frame rate becomes 1 fps.

FIG. 12 explains acquisition of information of one frame of an image. FIG. 12(a) explains an example for sequential acquiring information of each pixel. Each pixel 101 of a two-dimensional image 100 acquires information of one pixel by radiating pulse light and detecting reflected light at each measuring time (t=t1, t2, . . . , tm), and acquires information of one frame by repeating radiation and detection for all pixels. Accordingly, to acquire the information of one frame, a measurement time is required according to the pixel number.

Even when the pixel number of the lidar device is reduced to 100,000 pixels to shorten the measurement time, to acquire the information of one frame of the image, 100 ms (=100,000 pixels×1 μs) is required and the frame rate becomes 10 fps. The frame rates, 1 fps, 10 fps do not reach 30 fps that is a normal video rate. To apply to automatic driving of an automobile, 100 fps or more that is higher than the normal video rate is required. Therefore, to increase the frame rate by reducing the pixel number, it is required to further reduce the pixel number.

As a solution for increasing the frame rate, it is considered that plural lidar devices are combined to parallelly operate each lidar device. For example, such a constitution to realize 320,000 pixels by combining thirty two lidar devices having 100 fps at the pixel number of 10,000 pixels and parallelly operating them can be considered.

FIG. 12(b) explains an example for parallelly acquiring information of each pixel. A two-dimensional image 100 is constituted by a combination of blocks 100a-100d of plural lidar devices. For each pixel 101 of each of blocks 100a-100d, information of one pixel is acquired by radiating pulse light and detecting reflected light at each measurement time (t=t1, t2, . . . , tl). By repeating radiation and detection for all pixels of each of blocks 100a-100d, information of one frame is acquired. By a parallel operation of each block, the frame rate is improved.

Such a constitution that plural lidar devices are combined and each lidar device is parallelly operated has a problem that a system is made large and complicated, because there is a need of parallelly operating the devices while synchronizing an operation timing of each block.

An object of a light deflection device and a lidar device of the present invention is to realize a parallel operation with a simple constitution and avoid enlargement or complication of a system by solving the above-mentioned problem.

Solution to Problem

According to the present invention, the deflection angle of the light deflection device depends upon a wavelength and a refractive index of light. Light beams with respective wavelengths different from each other are simultaneously and parallelly deflected in directions of deflection angles each defined by the wavelength and the refractive index, so as to realize a parallel operation of plural light beams with a simple constitution.

The plural light beams with different wavelengths are deflected at different deflection angles different from each other defined by each wavelength or refractive index, and so they can be deflected simultaneously and parallelly. The plural deflected light beams can be distinguished from each other based on the difference in the wavelength and the deflection angle of the light even in a simultaneous and parallel operation.

(Light Deflection Device) The light deflection device according to the present invention has a beam deflector having a deflection angle that has dependency on a wavelength and a refractive index. The beam deflector simultaneously and parallelly deflects light beams with respective wavelengths different from each other in directions of deflection angles each defined by the wavelengths of the light beams and the refractive index of the beam deflector.

When the refractive index is fixed, the light deflection device deflects the wave-guided light at each of plural deflection angles defined corresponding to the change of the light wavelength.

When the refractive index is variable, the light deflection device deflects the wave-guided light at each deflection angle defined corresponding to the light wavelength and the refractive index. In this case, when the light wavelength is fixed, the light is deflected at each of plural deflection angles defined corresponding to the change of the refractive index with a deflection angle corresponding to the wavelength as a reference.

The beam deflector can be constituted by a single body for deflecting a light beam with each wavelength of the respective wavelengths using one element, and also can be constituted by a complex body in which plural elements for individually deflecting a light beam with each wavelength of the respective wavelengths are aligned in array.

In the single body constitution, the light beams with the respective wavelengths different from each other are guided to one beam deflector, so as to change the deflection angle. Also, a light beam with one wavelength or light beams with respective wavelengths different from each other are guided, and the refractive index of the beam deflector is changed, so as to change the deflection angle. Thereby, the plural light beams are deflected at the plural different deflection angles.

In the complex body constitution, plural beam deflectors for deflecting the guided light at a deflection angle defined corresponding to the light wavelength are parallelly arranged at each wavelength. The plural parallelly arranged beam deflectors deflect light beams at the plural deflection angles by guiding the light beams with the respective wavelengths different from each other to change the deflection angle, or guiding a light beam with one wavelength or light beams with respective wavelengths different from each other to change the deflection angle. Thereby, the plural light beams are deflected at the plural different deflection angles.

The light deflection device according to the present invention can include an emitter for forming emission light by deflecting the guided light, and/or a receiver for deflecting the light taken from outside and making it into incident light.

The light taken from outside may be reflected light obtained by reflecting emission light emitted from the emitter on an object.

The deflection angle of the light deflection device corresponds to an emission angle in the case of the emitter, and corresponds to an incident angle in the case of the receiver. The wavelength and the refractive index of the light of the light deflection device at the time of emission are made equal to those at the time of reception. Thereby, the deflection angles at the times of emission and reception can be made equal to each other, and only the light reflected in a direction opposite to the emission light can be received.

(Emitter) The emitter in the light deflection device according to the present invention includes a beam deflector, and a laser source for emitting plural laser beams with different wavelengths. The beam deflector simultaneously and parallelly emits the laser beams with the respective wavelengths emitted from the laser source in directions of deflection angles each defined by a wavelength of each laser beam and the refractive index of the beam deflector.

The emitter can be configured to have a wavelength multiplexer/demultiplexer between the laser source and the beam deflector. The wavelength multiplexer/demultiplexer wavelength-multiplexes the laser beams with the respective wavelengths from the laser source, and guides the obtained laser beam with the respective wavelengths to the beam deflector.

(Receiver) The receiver of the light deflection device according to the present invention includes a light detector for individually detecting laser beams. The beam deflector selectively, simultaneously and parallelly receives laser beams each having an incident angle that is a deflection angle defined by a wavelength of each laser beam and the refractive index of the beam deflector among the laser beams with the respective wavelengths reaching from outside. The light detector detects deflection light of the beam deflector.

The receiver can be configured to include a wavelength multiplexer/demultiplexer between the beam deflector and the light detector. The wavelength multiplexer/demultiplexer wavelength-demultiplexes the received laser beam with the respective wavelengths, and guides the obtained laser beams with the respective wavelengths to the light detector for detecting each wavelength.

The beam deflector according to the present invention can be a leakage waveguide having a well-known surface diffraction grating, or a multi-layer membrane structure or surface diffraction grating.

(Lidar device) The lidar device according to the prevent invention includes a light deflection device, a laser source for emitting plural laser beams with different wavelengths, and a light detection unit for individually detecting the laser beams. In the light deflection device, an emitter for simultaneously and parallelly emitting the laser beams with the respective wavelengths emitted from the laser source in directions of deflection angles each defined by the wavelengths of the laser beams and the refractive index of the beam deflector, and a receiver for selectively, simultaneously and parallelly receiving laser beams each having an incident angle that is a deflection angle among the laser beams with the respective wavelengths reaching from outside are constituted by the same element. The light detector individually detects the laser beams with the respective wavelength each received in the receiver at an incident angle that is the same angle as each deflection angle of the laser beam emitted by the emitter. The deflection angle of the emitter is made equal to the deflection angle of the receiver, so that the reflected light emitted from the emitter and reflected in contact with an object can be detected.

The lidar device can be configured to include a wavelength multiplexer/demultiplexer between the laser source and the beam deflector, and/or the beam deflector and the detector. The wavelength multiplexer/demultiplexer can wavelength-multiplex the laser beams with the respective wavelengths emitted from the laser source, and/or wavelength-demultiplex the received laser beam with the respective wavelengths into individual laser beams with the respective wavelengths.

Also, the beam deflector of the lidar device may be a leakage waveguide having a surface diffraction grating, or a multi-layer membrane structure or surface diffraction grating.

Advantageous Effects of Invention

As explained above, the light deflection device and the lidar device according to the present invention can realize a parallel operation with a simple constitution, and avoid enlargement or complication of a system.

BRIEF DESCRIPTION OF THE DRAWINGS

FIG. 2 is a drawing for explaining a general constitution of the lidar device according to the present invention.

FIG. 3 is a drawing for explaining first and second embodiments of an emitter of the light deflection device according to the present invention.

DESCRIPTION OF EMBODIMENTS

An embodiment of the present invention will be explained in details with reference to the drawings as follows. The general constitution example and operation of the light deflection device and the lidar device according to the present invention will be explained using FIGS. 1 and 2. Each embodiment of the light deflection device according to the present invention will be explained using FIGS. 3-5. An embodiment of the lidar device according to the present invention will be explained using FIG. 6. The light deflection device by the leakage waveguide will be explained using FIGS. 7 and 8. The two-dimensional scanning of the light deflection device will be explained using FIGS. 9 and 10. An example of the wavelength multiplexer/demultiplexer will be explained using FIG. 11.

(Outlines of Light Deflection Device and Lidar Device)

Figure 1:
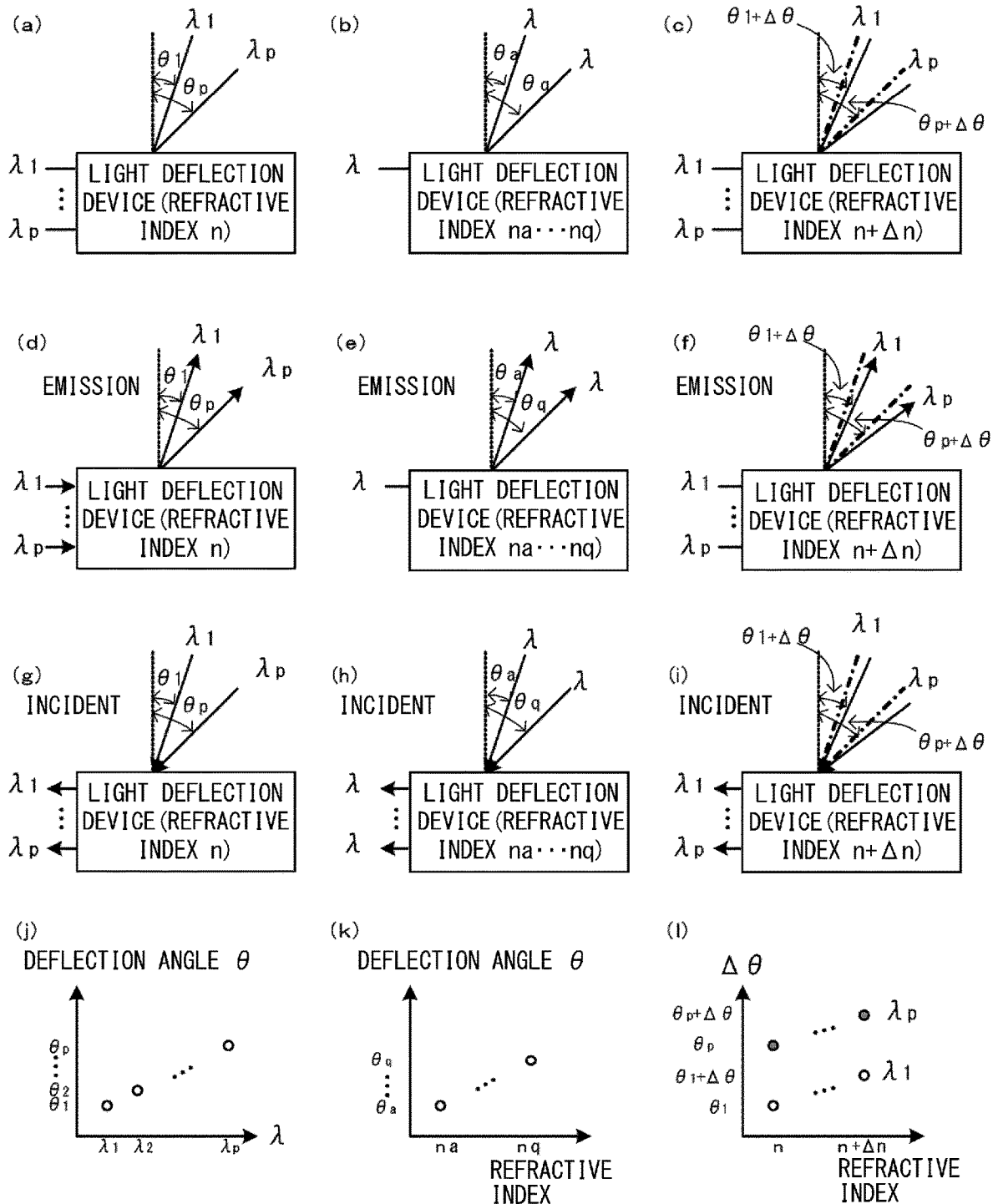
FIG. 1 is a drawing for explaining a general constitution of a light deflection device and a lidar device according to the present invention.

FIG. 1 is a drawing for explaining a general constitution of a light deflection device according to the present invention.

The light deflection device simultaneously and parallelly deflects each of light beams with respective wavelengths different from each other in a direction of each deflection angle individually defined by a wavelength and a refractive index, based on dependency of the deflection angle on the wavelength and the refractive index of the light, and parallelly operates plural light beams. The plural deflected light beams can be distinguished from each other based on the difference in the light wavelength and the deflection angle. The light deflection device can be configured to include a beam deflector (not shown) having a deflection angle that depends on the wavelength and the refractive index.

FIG. 1 explains how the deflection angle of the light deflection device depends on the wavelength and the refractive index. FIGS. 1(a)-(c) show a deflection angle, FIGS. 1(d)-(f) show an emission angle when the light deflection device is used as an emitter, FIGS. 1(g)-(i) show an incident angle when the light deflection device is used as a receiver, and FIGS. 1(j)-(l) show the deflection angle and the change of the deflection angle. Magnitudes of the angle or the change shown in FIGS. 1(a)-(l) are generally shown for simple explanation, and are not shown in an actual state.

The light deflection device deflects light beams at different deflection angles based on the wavelength and/or the refractive index according to the dependency of the deflection angle on the wavelength and the refractive index.

FIG. 1(a) shows respective deflection angles θ1-θp to different wavelengths λ1-λp at a fixed refractive index n. For example, the light deflection device deflects the light with the wavelength λ1 at the deflection angle θ1 corresponding to the refractive index n and the wavelength λ1, when the wavelength of the guided light is λ1, and deflects the light with the wavelength λp at the deflection angle θp corresponding to the refractive index n and the wavelength λp, when the wavelength of the guided light is λp.

FIG. 1(b) shows respective deflection angles θa-θq corresponding to different refraction indices na-nq at the fixed wavelength λ. For example, the light deflection device deflects the guided light with the wavelength λ at the deflection angle θa corresponding to the wavelength λ and the refractive index na, when the refractive index is na, and deflects the guided light with the wavelength λ at the deflection angle θq corresponding to the wavelength λ and the refractive index nq, when the refractive index is nq.

FIG. 1(c) shows the changes of the deflection angles θ1-θp when the refractive index n is changed by Δn at respective deflection angles θ1-θp to different wavelengths λ1-λp at the refractive index n. For example, the light deflection device deflects the light with the wavelength λ1 at the deflection angle θ1+Δθ corresponding to the wavelength λ1 and the refractive index n+Δn when the wavelength of the guided light is λ1, and deflects the light with the wavelength λp at the deflection angle θp+Δθ corresponding to the wavelength λp and the refractive index n+Δn when the wavelength of the guided light is λp.

FIG. 1(d) to FIG. 1(f) show a constitution of an emitter for deflecting light beams guided to the light deflection device, and emitting them to the outside of the light deflection device.

FIG. 1(d) shows that light beams are emitted using the respective deflection angles θ1-θp to the different wavelengths λ1-λp as an emission angle at a fixed refractive index n. The light deflection device emits a light beam of the light with the wavelength λ1 using the deflection angle θ1 corresponding to the refractive index n and the wavelength λ1 as an emission angle, when the wavelength of the guided light is λ1, and emits a light beam of the light with the wavelength λp using the deflection angle θp corresponding to the refractive index n and the wavelength λp as an emission angle, when the wavelength of the guided light is λp. The light beams of the emission light have different wavelengths and emission angles, so that the emission light beams can be distinguished from each other.

FIG. 1(e) shows that light beams are emitted using the respective deflection angles θa-θq to the different refraction indices na-nq as an emission angle at a fixed wavelength λ. The light deflection device emits light beams of the guided light with the wavelength λ using the deflection angle θa corresponding to the wavelength λ and the refractive index na as an emission angle, when the refractive index is na, and emits light beams of the guided light with the wavelength λ using the deflection angle θq corresponding to the wavelength λ and the refractive index nq as an emission angle, when the refractive index is nq. The light beams of the emission light have different emission angles, so that the emission light beams can be distinguished from each other.

FIG. 1(f) shows that the light beams are emitted using the change of the deflection angles θ1-θp when the refractive index n is changed by Δn as an emission angle, at the respective deflection angles θ1-θp to the different wavelengths λ1-λp at the refractive index n. The light deflection device emits the light with the wavelength λ1 using the deflection angle θ1+Δθ corresponding to the wavelength λ1 and the refractive index n+Δn as an emission angle, when the wavelength of the guided light is λ1, and emits the light with the wavelength λp using the deflection angle θp+Δθ corresponding to the wavelength λp and the refractive index n+Δn as an emission angle, when the wavelength of the guided light is λp. The emission angle of the light beams of the emission light can be made large in a range of Δθ to the emission angle θ defined by each wavelength.

FIG. 1(g) to FIG. 1(i) show a constitution of a receiver for deflecting the light beams reaching the light deflection device and taking them into the light deflection device.

FIG. 1(g) shows that light beams each having an incident angle that includes the respective deflection angles θ1-θp to the different wavelengths λ1-λp at the fixed refractive index n are received among the light beams reaching the light deflection device.

The light deflection device receives the light beams at the incident angle equal to the deflection angle θ1 corresponding to the refractive index n and the wavelength λ1 among the reached light beams, when the wavelength of the light beam is λ1, and receives the light beams at the incident angle equal to the deflection angle θp corresponding to the refractive index n and the wavelength λp among the reached light beams, when the wavelength of the light beam is λp. The light beams of the incident light have different wavelengths and incident angles, so that the respective incident light beams can be distinguished from each other.

FIG. 1(h) shows that light beams each having an incident angle that includes the respective deflection angles θa-θq to the different refraction indices na-nq at the fixed wavelength λ are received among the light beams reaching the light deflection device. The light deflection device receives the light beams among the reached light beam with the wavelength λ using the deflection angle θa corresponding to the wavelength λ and the refractive index na as an incident angle, when the refractive index is na, and receives the light beams among the reached light beam with the wavelength λ using the deflection angle θq corresponding to the wavelength λ and the refractive index nq as an incident angle, when the refractive index is nq. The light beams of the incident light have different incident angles, so that the respective incident light beams can be distinguished from each other.

FIG. 1(i) shows that the light beams are received using the change of the deflection angles θ1-θp when the refractive index n is changed by Δn as an incident angle, at the respective deflection angles θ1-θp to the different wavelengths λ1-λp at the refractive index n. The light deflection device receives the light beams of the light with the wavelength λ1 using the deflection angle θ1+Δθ corresponding to the wavelength λ1 and the refractive index n+Δn as an incident angle, and receives the light beams of the light with the wavelength λp using the deflection angle θp+Δθ corresponding to the wavelength λp and the refractive index n+Δn as an incident angle, among the light beams reaching the light deflection device. The incident angle of the light beams of the incident light can be made large in a range of Δθ to the incident angle θ defined by each wavelength.

FIG. 1(j) shows an outline of dependency of the deflection angle θ to the wavelength λ, FIG. 1(k) shows an outline of dependency of the deflection angle θ to the refractive index n, and FIG. 1(l) shows an outline of the change Δθ of the deflection angle θ to the change Δn of the refractive index n.

FIG. 2 shows a general constitution of a lidar device 10.

FIG. 2(a) shows that the lidar device 10 is constituted by a single body light deflection device 1. The single body light deflection device 1 simultaneously emits plural light beams from one beam deflector at different emission angles, and simultaneously receives the plural light beams by the same beam deflector at an incident angle the same as the emission angle. The plural light beams can be separately emitted at each emission angle by differentiating the emission angle of each emission light, and can be separately received at each incident angle by differentiating the incident angle of each incident light.

FIG. 2(b) shows an array constitution in which plural light deflection devices 1 are aligned in a line form. Each light deflection device 1 constituting the lidar device 10 can simultaneously acquire plural pixel data by parallelly operating emission and reception at different deflection angles respectively. In this constitution, the pixel data as is similar in the constitution that the plural array structures are aligned can be acquired by time-changing the wavelength and the refractive index of each light deflection device 1.

FIG. 2(c) shows a two-dimensional arrangement constitution in which plural array structures shown in FIG. 2(b) are aligned. A two-dimensional arrangement lidar device 10B can simultaneously emit and receive the plural light beams at a distinguishable state, by differentiating the emission angle and the incident angle of each light deflection device 1.

Each Embodiment of Light Deflection Device

Figure 4:
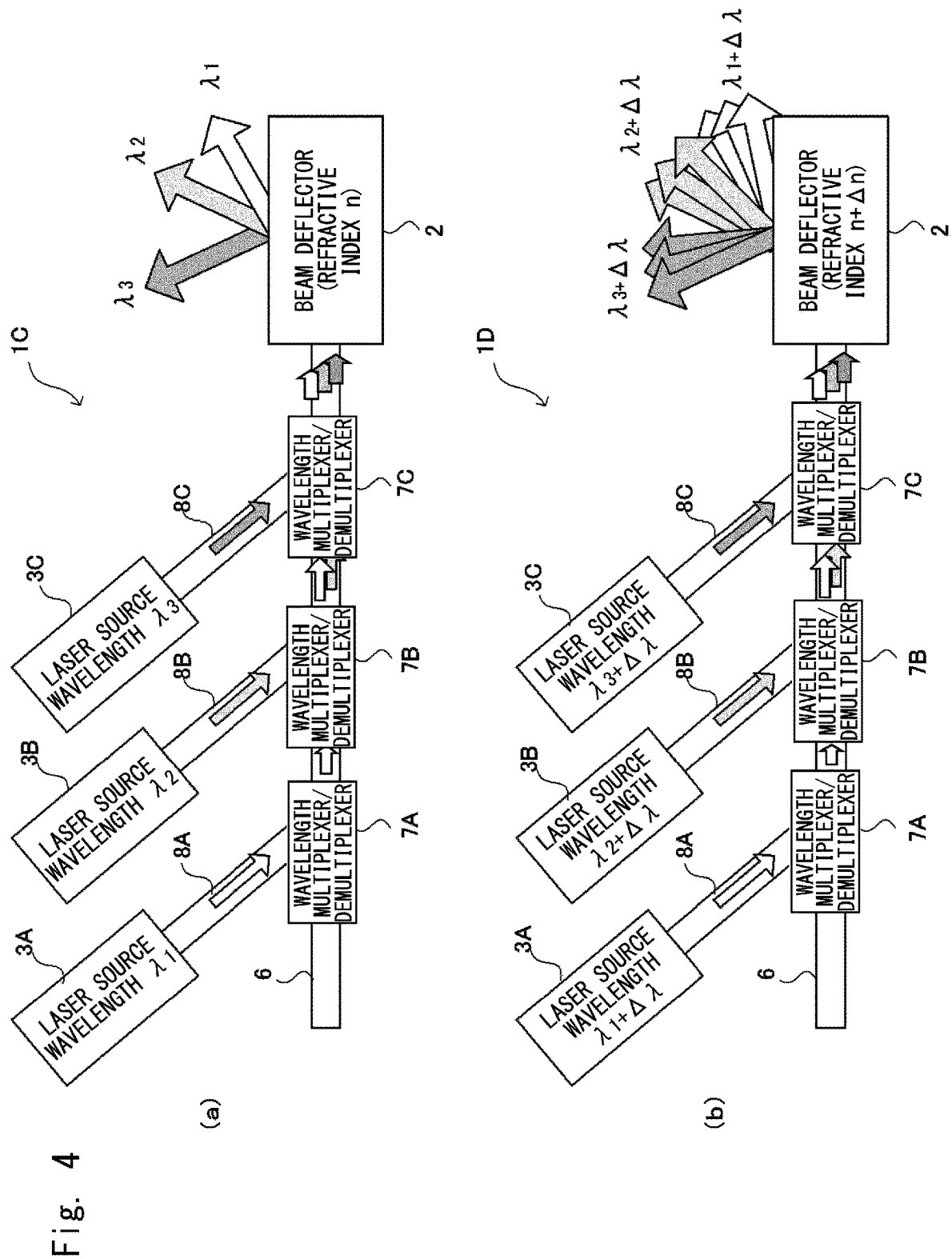
FIG. 4 is a drawing for explaining third and fourth embodiments of the emitter of the light deflection device according to the present invention.
Figure 5:
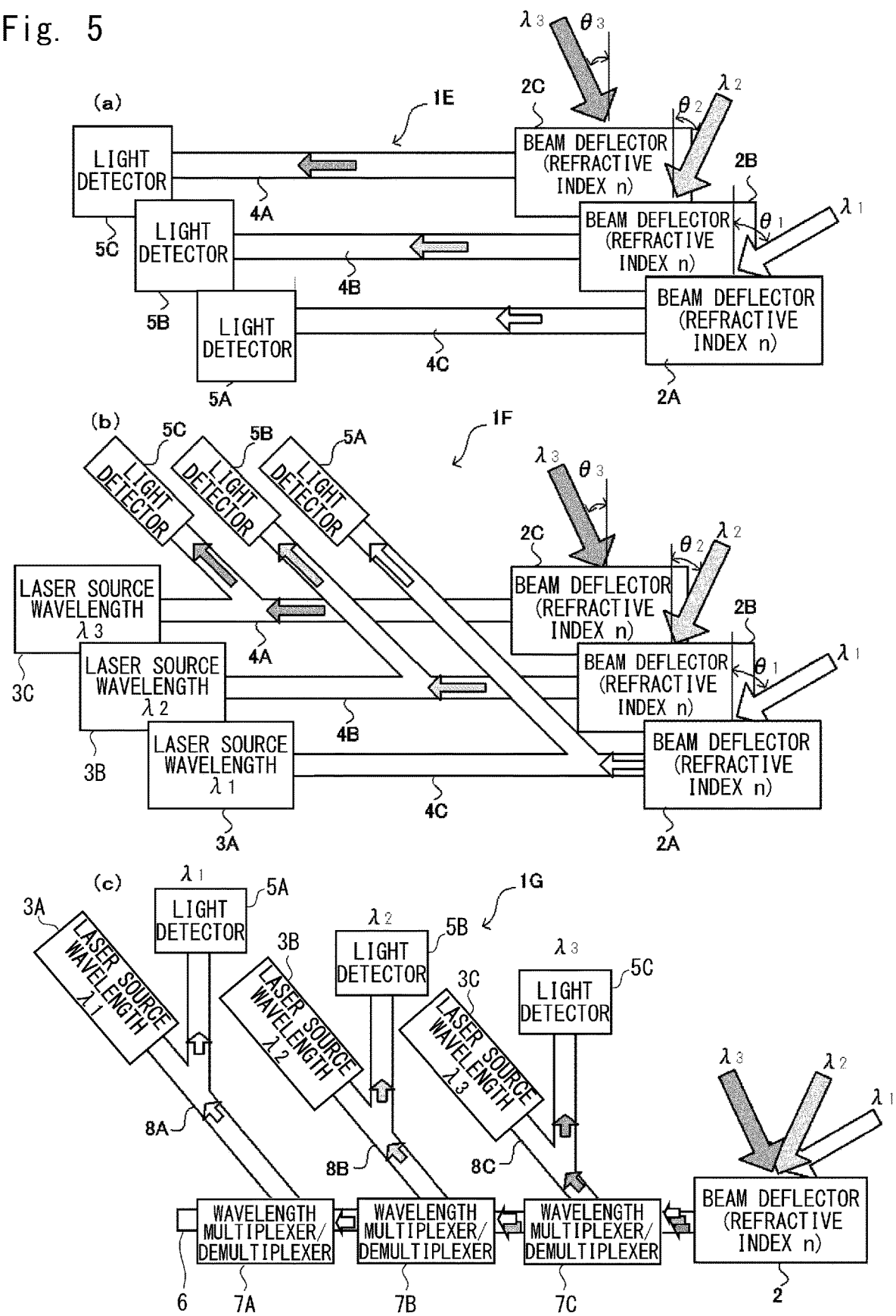
FIG. 5 is a drawing for explaining first and second embodiments of a receiver of the light deflection device according to the present invention.

Each embodiment of the light deflection device according to the present invention will be explained using FIGS. 3-5 as follows. FIGS. 3 and 4 show four embodiments of the light deflection device when constituted as an emitter, and FIG. 5 shows three embodiments of the light deflection device when constituted as a receiver. An example of the light deflection device respectively using three beam deflectors 2A-2C, laser sources 3A-3C and waveguides 4A-4C is illustrated. The number of components constituting the light deflection device is not limited to 3, and can be an arbitrary plural number.

First Embodiment of Emitter

FIG. 3(a) shows a first embodiment in which the light deflection device is constituted as an emitter.

A light deflection device 1A in the first embodiment constitutes an emitter for guiding laser beams with wavelengths λ1-λ3 different from each other generated by the laser sources 3A-3C to the beam deflectors 2A-2C via the waveguides 4A-4C, and radiating the light at the emission angle corresponding to each wavelength.

The laser sources 3A-3C may be constituted that the plural laser sources for generating each wavelength are constituted by the same integrated circuit, the plural laser sources for generating each wavelength are used, or external laser sources are used. The beam deflectors 2A-2C may have such a constitution that the plural beam deflectors are formed on one substrate, and the plural beam deflectors formed on respective substrates are arranged. The wavelength λ generated by each laser source is fixed.

The beam deflector 2A radiates the laser beam from the laser source 3A via the waveguide 4A at a deflection angle θ1 corresponding to the wavelength λ1 of the laser beam as an emission angle. In the beam deflectors 2B, 2C, the light is emitted at deflection angles θ2, θ3 corresponding to the wavelengths λ2, λ3 of each laser beam as is similar to the beam deflector 2A. The refractive index n of each beam deflector is fixed.

Second Embodiment of Emitter

FIG. 3(b) shows a second embodiment in which the light deflection device is constituted as an emitter.

The light deflection device 1B in the second embodiment constitutes an emitter for guiding laser beams with wavelengths λ1-λ3 different from each other generated by the laser sources 3A-3C to the beam deflectors 2A-2C via the waveguides 4A-4C, and radiating the light at the emission angle corresponding to each wavelength, as is similar in the first embodiment.

The light deflection device 1A in the first embodiment has a wavelength λ generated by each laser source, and a fixed refractive index n of each beam deflector, and the light deflection device 1B in the second embodiment is constituted so that the wavelength λ and the refractive index n are made variable.

The laser sources 3A-3C may be constituted that the plural laser sources for generating each wavelength are constituted by the same integrated circuit, the plural laser sources for generating each wavelength are used, or external laser sources are used. The beam deflectors 2A-2C may have such a constitution that the plural beam deflectors are formed on one substrate, and the plural beam deflectors formed on respective substrates are arranged.

The beam deflector 2A radiates the laser beam from the laser source 3A via the waveguide 4A at a deflection angle θ1 corresponding to the wavelength λ1 of the laser beam as an emission angle. At that time, the emission angle of the laser beam with the wavelength λ1 generated by the laser source 3A is made variable into λ1+Δλ, so that the light is emitted by the emission angle of the light beam with the wavelength λ1+Δλ from the beam deflector 2A.

In the beam deflectors 2B, 2C, the light is emitted by changing the emission angle of the light beams with the wavelengths λ2+Δλ, λ3+Δλ as is similar to the beam deflector 2A.

According to the second embodiment, the light beams with respective wavelengths can be emitted by changing the wavelength λ, and a radiation angle of the light beam can be changed by changing the refractive index n by width Δn, so as to scan the light beams.

Third Embodiment of Emitter

FIG. 4(a) shows a third embodiment in which the light deflection device is constituted as an emitter.

The light deflection device 1C in the third embodiment constitutes an emitter for guiding laser beams with wavelengths λ1-λ3 different from each other generated by the laser sources 3A-3C to one beam deflector 2 via one bus waveguide 6, and radiating the plural light beams with different wavelengths at the emission angle corresponding to each wavelength. As is similar to the first embodiment, the third embodiment has a constitution that the wavelength λ generated by each laser source and the refractive index n of each beam deflector are fixed, as is similar to the first embodiment.

The laser sources 3A-3C may be constituted that the plural laser sources for generating each wavelength are constituted by the same integrated circuit, the plural laser sources for generating each wavelength are used, or external laser sources are used. The beam deflectors 2A-2C are formed on a substrate. The wavelength λ generated by each laser source is fixed.

A bus waveguide 6 is provided with plural wavelength multiplexer/demultiplexers 7A-7C, and is connected to the beam deflector 2 at one end. The laser sources 3A-3C are connected to the respective wavelength multiplexer/demultiplexers 7A-7C via waveguides 8A-8C, and the laser source with the wavelengths λ1-λ3 emitted from the respective laser sources 3A-3C are guided to the beam deflector 2.

The beam deflector 2 guides the laser beam from the laser source 3A via the waveguide 8A, the wavelength multiplexer/demultiplexer 7A, and the bus waveguide 6, and radiates the light at the deflection angle θ1 corresponding to the wavelength λ1 of the laser beam as an emission angle. The beam deflectors 2B, 2C guide the laser beam from the laser sources 3B, 3C via the waveguides 8B, 8C, the wavelength multiplexer/demultiplexers 7B, 7C, and the bus waveguides 6, and radiates the light at the deflection angles θ2, θ3 corresponding to the wavelengths λ2, λ3 of the laser beam as an emission angle.

Fourth Embodiment of Emitter

FIG. 4(b) shows a fourth embodiment in which the light deflection device is constituted as an emitter.

The light deflection device 1D in the fourth embodiment constitutes an emitter for guiding laser beams with wavelengths λ1-λ3 different from each other generated by the laser sources 3A-3C to one beam deflector 2 via one bus waveguide 6, and radiating the plural light beams at the emission angle corresponding to each wavelength, as is similar to the third embodiment.

The light deflection device 1C in the third embodiment is constituted that the wavelength λ generated by each laser source, and the refractive index n of each beam deflector are fixed, while the light deflection device 1D in the fourth embodiment is constituted that the wavelength λ and the refractive index n are variable.

The laser sources 3A-3C may be constituted that the plural laser sources for generating each wavelength are constituted by the same integrated circuit, the plural laser sources for generating each wavelength are used, or external laser sources are used. The beam deflector 2 may be formed on one substrate.

The beam deflector 2A guides the laser beam from the laser source 3A via the waveguide 8A and the bus waveguide 6, and radiates the light at the deflection angle θ1 corresponding to the wavelength λ1 of the laser beam. At that time, the wavelength λ1 of the laser beam generated by the laser source 3A is made variable into λ1+Δλ, so that the light beam is emitted by changing the emission angle of the light beam with the wavelength λ1+Δλ from the beam deflector 2.

Also, the beam deflector 2 emits the laser beam with the wavelength λ1 from the laser source 3A, as well as the laser beams with the wavelengths λ2, λ3 from the laser sources 3B, 3C after changing the emission angles of the laser beams with the wavelengths λ2+Δλ, λ3+Δλ, as is similar to the laser beam with the wavelength λ1+Δλ.

In the fourth embodiment, the light beams with respective wavelengths can be emitted by changing the wavelength λ, and the radiation angle of the light beam can be changed to scan the light beam by changing the refractive index n by the width Δn.

The first to third embodiments in which the light deflection device is constituted as a receiver will be explained as follows.

First Embodiment of Receiver

In the first embodiment, the receiver is constituted only by a beam deflector and a light detector. FIG. 5(a) shows the first embodiment in which the light deflection device is constituted as a receiver.

A light deflection device 1E in the first embodiment of the receiver includes plural beam deflectors 2A-2C, and plural light detectors 5A-5C connected to the beam deflectors 2A-2C via waveguides 4A-4C.

In the light deflection device 1E, the respective beam deflectors 2A-2C selectively, simultaneously and parallelly receives laser beams each having an incident angle defined by the wavelength of each laser beam and the refractive index of the beam deflector, among the laser beams with the respective wavelengths reaching from outside, and individually detect the received laser beams by the light detectors.

The beam deflectors 2A-2C may be configured so that the plural beam deflectors are formed on one substrate, and that the plural beam deflectors formed on each deflector are arranged. The light detectors 5A-5C may be constituted by using the plural light detectors or by the same integrated circuit.

The beam deflector 2A receives light beam each having an incident angle that is a deflection angle θ1 among the plural reached laser beams. The incident light beams are detected by the light detector 5A via the waveguide 4A.

The beam deflectors 2B, 2C receive light beams having incident angles that are deflection angles θ2, θ3, among the plural reached laser beams, as is similar to the beam deflector 2A. The incident light beams are detected by the light detectors 5B, 5C via the waveguides 4B, 4C. Also, the refractive index n of the respective beam deflectors 2A-2C is fixed.

The light beams radiated from an emitter (not shown) collide with an object, and are reflected. Light beams reflected toward each beam deflector among the reflected light beams are detected by the light detector 5, converted into electric signals, and detected.

Second Embodiment of Receiver

In the second embodiment, the beam deflector and the light detector are combined, and can be integrated. FIG. 5(b) shows the second embodiment in which the light deflection device is constituted as a receiver.

A light deflection device 1F in the second embodiment of the receiver includes plural beam deflectors 2A-2C, and plural light detectors 5A-5C connected to the beam deflectors 2A-2C via the waveguides 4A-4C. In FIG. 5(b), the waveguides 4A-4C are branched, the laser sources 3A-3C are connected to one branch end, and the light detectors 5A-5C are connected to the other branch end.

In the light deflection device 1F, the respective beam deflectors 2A-2C selectively, simultaneously and parallelly receive laser beams each having an incident angle defined by the wavelength of each laser beam and the refractive index of the beam deflector, among the laser beams with the respective wavelengths reaching from outside, and individually detect the received laser beams by the light detectors.

The beam deflectors 2A-2C may be configured so that the plural beam deflectors are formed on one substrate, and that the plural beam deflectors formed on each deflector are arranged. The laser sources 3A-3C may be constituted by providing the plural laser sources generating each wavelength on the same integrated circuit, using the plural laser sources generating each wavelength, or using an external laser source.

The beam deflector 2A radiates the light using the deflection angle θ1 corresponding to the wavelength λ1 of the laser beam of the connected laser source 3A as an emission angle, and receives light beams having an incident angle that is the deflection angle θ1, among the plural reached laser beams. The incident light beams are detected by the light detector 5A via the waveguide 4A.

The beam deflectors 2B, 2C radiate the light using the deflection angles θ2, θ3 corresponding to the wavelengths λ2, λ3 of the laser beams from the laser sources 3B, 3C connected to the respective beam deflectors 2B, 2C as emission angles, and receive light beams having incident angles that are the deflection angles θ2, θ3, among the plural reached laser beams, as is similar to the beam deflector 2A. The incident light beams are detected by the light detectors 5B, 5C via the waveguides 4B, 4C. Also, the refractive index n of each of the beam deflectors 2A-2C is fixed.

The light beams radiated from the beam deflectors 2A-2C collide with an object, and then are reflected toward the respective beam deflectors. The reflected light beams are returned in an optical path between the beam deflectors 2A-2C and the object through the same optical path as the emission light. Therefore, the beam deflectors 2A-2C are maintained in a condition that the light is radiated, so that they can be operated as a light antenna for receiving light at the same incident angle as the emission angle. A multiplexer/demultiplexer is arranged on a path between the laser source and the object, and detected by a light detector 5, so that the reflected light can be converted into electric signals.

Third Embodiment of Receiver

In the third embodiment, the beam deflector and the light detector are combined, and can be integrated, as is similar to the second embodiment. FIG. 5(c) shows the third embodiment in which the light deflector is constituted as a receiver.

A light deflection device 1G in the third embodiment of the receiver includes one beam deflector 2, and plural light detectors 5A-5C connected to the beam deflector 2 and the bus waveguide 6 via wavelength multiplexer/demultiplexers 7A-7C and waveguides 8A-8C. In FIG. 5(b), the wavelength multiplexer/demultiplexers 7A-7C on the bus waveguide 6 respectively connect the laser sources 3A-3C and the light detectors 5A-5C via the waveguides 8A-8C.

In the light deflection device 1G, the beam deflector 2 selectively, simultaneously and parallelly receives laser beams each having an incident angle defined by the wavelength of each laser beam and the refractive index of the beam deflector, among the laser beams with the respective wavelengths reaching from outside, and individually detects the received laser beams by the light detector.

The beam deflector 2 is formed on a substrate. Also, the laser sources 3A-3C may be constituted by providing the plural laser sources generating each wavelength on the same integrated circuit, using the plural laser sources generating each wavelength, or using an external laser source.

The beam deflector 2 radiates the light using the deflection angles θ1-θ3 corresponding to the respective wavelengths λ1-λ3 of the laser beam of the plural laser sources 3A-3C connected via the bus waveguide 6 as an emission angle, and receives light beams having incident angles that are the deflection angles θ1-θ3, among the plural reached laser beams. The incident light beams are detected by the respective light detectors 5A-5C via the bus waveguide 6, the wavelength multiplexer/demultiplexers 7A-7C, and the waveguides 8A-8C.

The beam deflectors 2B, 2C radiate the light using the deflection angles θ2, θ3 corresponding to the wavelengths λ2, λ3 of the laser beams from the laser sources 3B, 3C connected to the respective beam deflectors 2B, 2C as emission angles, and receive light beams having incident angles that are the deflection angles θ2, θ3, among the plural reached laser beams, as is similar to the beam deflector 2A. The incident light beams are detected by the light detectors 5B, 5C via the waveguides 4B, 4C. Also, the refractive index n of each of the beam deflectors 2A-2C is fixed.

The light beam radiated from the beam deflector 2 is emitted at the emission angle corresponding to each wavelength, collides with an object, and then is reflected toward the respective beam deflectors. The reflected light beams are returned in an optical path between the beam deflectors 2 and the object through the same optical path as the emission light for each wavelength. Therefore, the beam deflector 2 is maintained in a condition that the light is radiated, so that it can be operated as a light antenna for receiving light at the same incident angle as the emission angle. A wavelength multiplexer/demultiplexer 7 is arranged on a path between the laser source and the object, and the reflected light beam(s) detected by a light detector 5, so that the reflected light can be converted into electric signals.

Embodiment of Lidar Device

Figure 6:
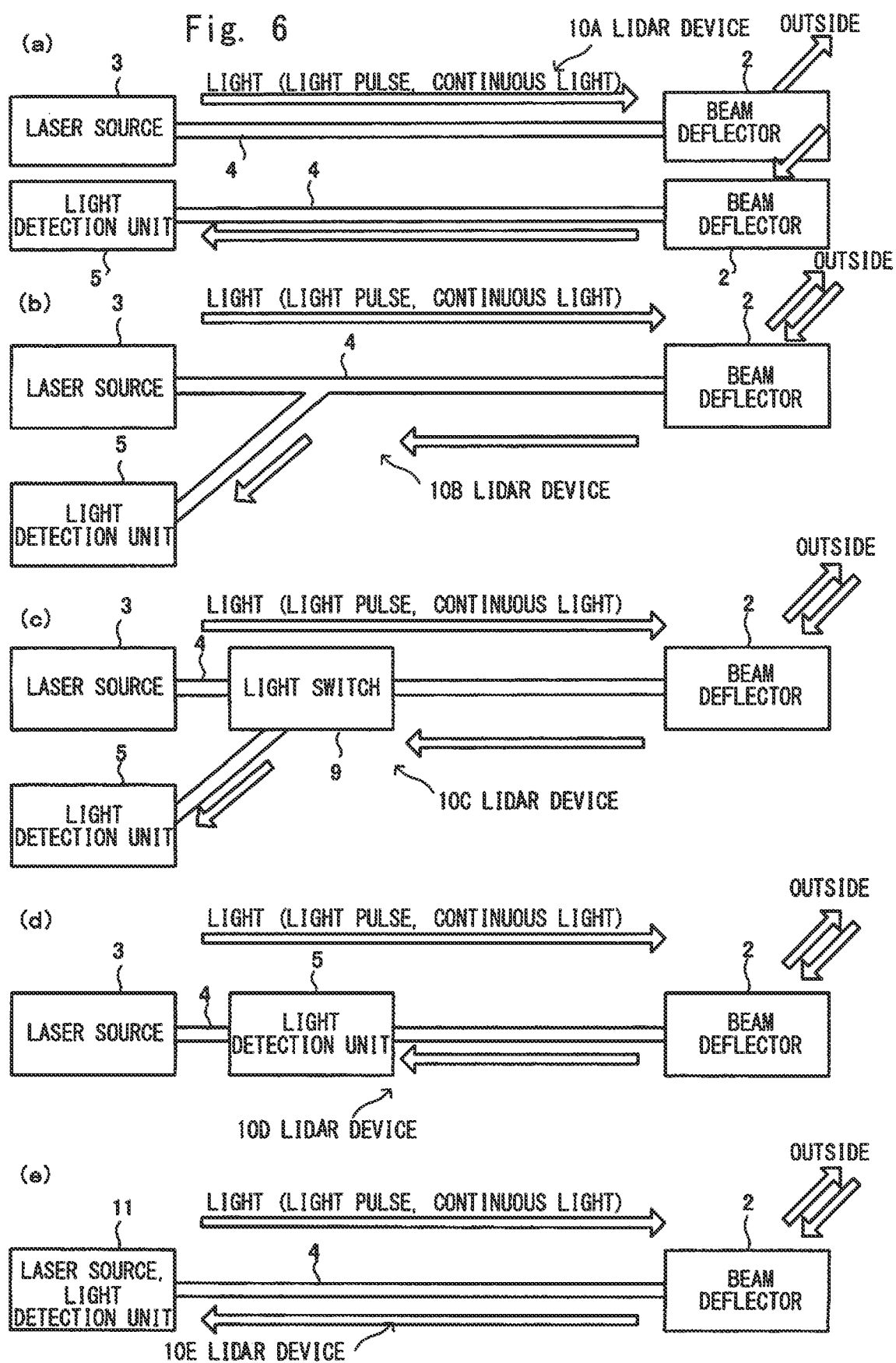
FIG. 6 is a drawing for explaining an embodiment of the lidar device according to the present invention.

A lidar device using reflected light beams can be constituted in plural embodiments. FIG. 6 is a drawing for explaining each of first to fifth embodiments of the lidar device.

In the first embodiment of the lidar device, the receiver and the emitter are constituted individually.

FIG. 6(a) shows the first embodiment of the lidar device. A lidar device 10A in the first embodiment individually includes an emitter constituted by a laser source 3, a waveguide 4 and a beam deflector 2, and a receiver constituted by a beam deflector 2, a waveguide 4, and a light detector 5 (photodiode), which are arranged parallelly. The emitter emits the light from the laser source 3 to outside from the beam deflector 2, and the receiver receives the light colliding with the object and reflected, makes the reflected light pass through a filter (not shown), and guides and detects the light to the light detection unit 4 via a branch path.

The light reflected from the object is largely expanded and dissipated. Therefore, even in a constitution that the receiver is arranged beside the emitter, an angle of light beam that can be received by the receiver is set slightly different from the radiation angle of the emitter, so that the reflected light can be received without directly receiving the light emitted from the emitter.

FIG. 6(b) shows the second embodiment of the lidar device. The lidar device 10A in the second embodiment has a constitution that the waveguide 4 is branched and the light detection unit 5 (photodiode) is arranged at one end of the branch path. The beam deflector 2 passes the received reflected light through a filter (not shown), and then guides and detects the light to the light detection unit 5 via the branch path.

FIG. 6(*c*) shows the third embodiment. The lidar device 10B in the third embodiment inserts a light switch 9 in the waveguide 4, is switched to the light detection unit 5 (photodiode) side after the laser beam from the laser source 3 passes, and guides the laser beam reflected and returned to the light detection unit 5 (photodiode) at high efficiency.

FIG. 6(*d*) shows the fourth embodiment. A photodiode forming a p-n junction on an Si waveguide can detect light of a long wavelength band that cannot be actually detected by causing sub-band gap absorption via crystal defects when a strong reverse bias is applied. The lidar device 10C in the third embodiment inserts the photodiode forming the above p-n junction as the light detection unit 5 in a middle of the waveguide 4, is changed to a reverse bias after the laser beam from the laser source 3 passes, and detects a reflected light pulse.

FIG. 6(*e*) shows the fifth embodiment. The lidar device 10D in the fourth embodiment includes a pulse light source/light detection unit 11 serving as a light source and a light detection unit. The pulse light source/light detection unit 11 can be operated as a photodiode by applying a reverse bias to a semiconductor laser serving as a pulse light source. In this constitution, the pulse light source/light detection unit 11 emits the laser beam, then is operated as the photodiode by applying the reverse bias, and detects the reflected and returned laser beam.

In each embodiment of the lidar device using reflected light, the light from the laser source may be a light pulse or a continuous light. The lidar device can measure a distance by a TOF method when the light pulse is used, and by an FMCW method when the continuous light is used.

In the constitution of the lidar device in each embodiment, even when the light with the same wavelength comes from a different direction, the incident angle is different. So, the light is not reversed, is not coupled to the original waveguide, and is not incident on the light detection unit (photodiode).

In respective embodiments shown in FIG. 6, a light filter of a wavelength filter may be inserted in the waveguide 4. The light filter is a filter for passing the wavelength of the laser beam of the laser source, and is more preferably a variable wavelength filter for changing a passage wavelength in synchronous with the change of a wavelength when the wavelength of the laser source is changed.

In an environment, light beams have various wavelengths, and the light with the wavelength different from that of the laser source may reach the beam deflector 2 of the light deflection device 1 as a noise component. Even when the incident angle of the light with the different wavelength is identical to the emission angle of the light beam, the noise component with the different wavelengths cannot be coupled to the light waveguide. Some of the noise components reaching the beam deflector 2 from another direction may be coupled and returned to the light waveguide. The light filter can remove the noise component coupled to the light waveguide. The removal of the noise component contributes to improvement of an SN ratio when detecting reflection signals of the lidar device.

Light Deflection Device Due to Leakage Waveguide

Then, a constitution example of the beam deflector will be explained. The beam deflector can be constituted by a leakage waveguide. The leakage waveguide radiates the light beams propagating through the waveguide in an upward direction or a diagonal direction by a diffraction grating engraved on the waveguide and multi-layer membranes formed on upper and lower sides of the waveguide. The light beams are radiated uniformly, so that sharp light beams can be obtained. The radiation angle depends on the light wavelength λ and the refractive index n of the waveguide, so that the light can be deflected by changing the light wavelength λ and/or the refractive index n.

In a leakage waveguide type beam deflector, the deflection angle can be enlarged by using a slow light structure as a waveguide.

Figure 7:
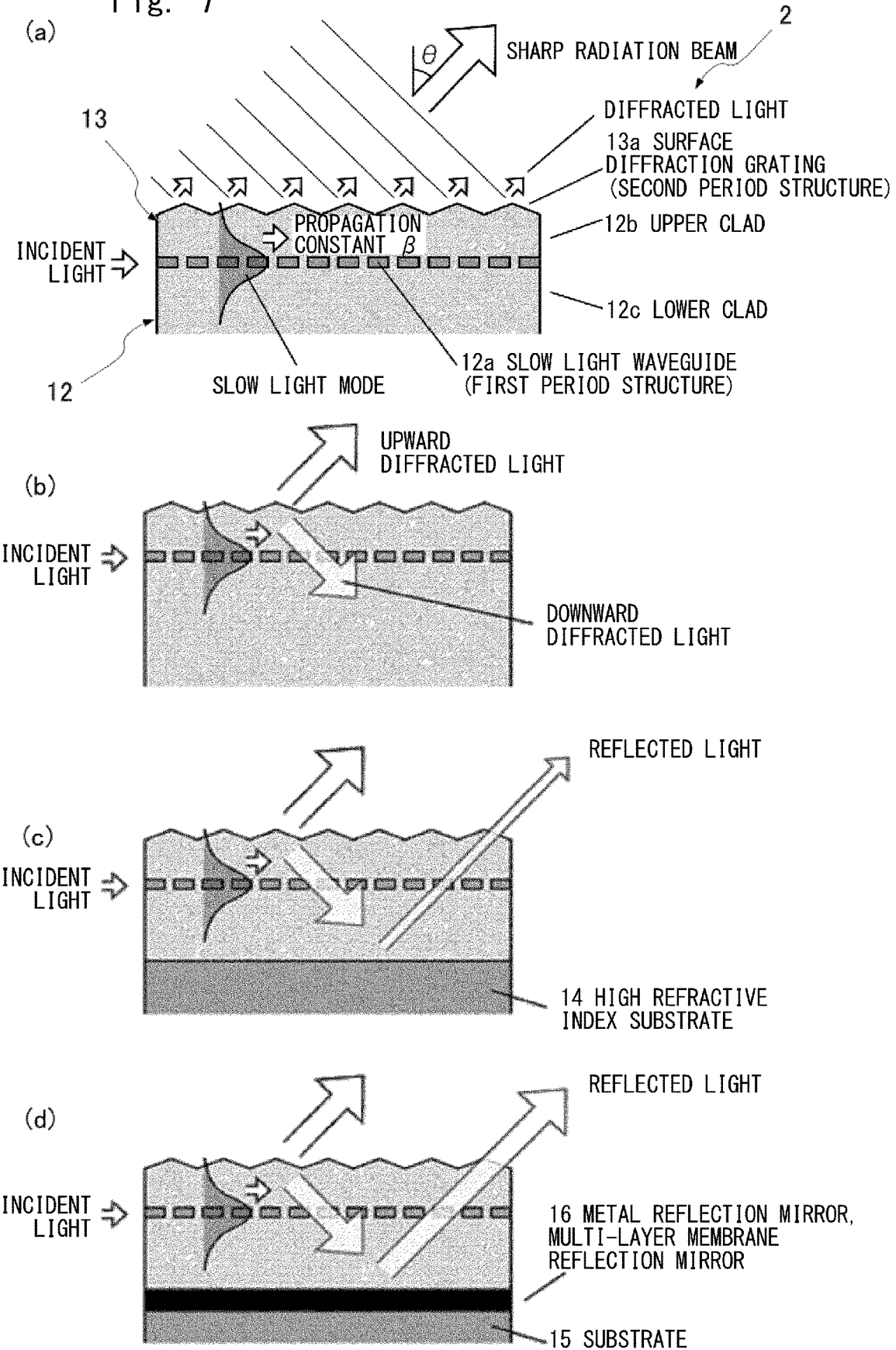
FIG. 7 is a drawing for explaining the light deflection device by a leakage waveguide according to the present invention.

FIG. 7 shows a constitution example of a slow light structure in a leakage waveguide type beam deflector. In FIG. 7(*a*), a waveguide unit 12 of the beam deflector 2 includes a slow light waveguide 12a constituted by arranging a second refractive index medium in a period a between an upper clad 12b and a lower clad 12c of a first refractive index medium. A first period structure obtained by periodically arranging the second refractive index medium to the clad with the refractive index of the first refractive index medium at the period a is formed on the slow light waveguide 12a. The first refractive index medium can be selected from a medium with a higher refractive index than the second refractive index medium. In a period structure with large indentations formed by deeply etching a material with a large refractive index, when the light is received from a direction for propagating the period structure, light beams with a small group speed (slow light) are generated. A slow light waveguide 12a propagates the light beams received from one end at a slow light mode of a low group speed.

An emission unit 13 of the beam deflector 2 includes a surface diffraction grating 13a at a position adjacent to the upper clad 12b. A surface diffraction grating 13a includes an uneven shaped structure at a period Λ. The uneven shape of the period Λ constitutes a second period structure at the period Λ between the refractive index n of the refractive index medium constituting the surface diffraction grating 13a and the refractive index $n_{out}$ of an external medium such as air.

In the slow light in the slow light waveguide 12a by the first period structure, a propagation constant β is significantly changed by a slight change of propagation conditions such as the light wavelength λ and the refractive index n of the waveguide. Such light propagates while having enlargement (a penetration component) of an electromagnetic field on its periphery. When the emission unit 13 having a period structure (a second period structure) with small indentations formed by a material of a small refractive index or shallow etching is arranged at a distance slightly contacting the penetration component, the slow light is coupled, diffused or diffracted, and is gradually radiated in an upward or diagonal direction. The radiation occurs in a wide range in a wavelength travelling direction, and is aligned in a phase. Therefore, when the light deflection device is seen from a lateral direction along the propagation direction, the emission beam becomes a sharp light beam with a high quality.

When the light wavelength λ and the refractive index n of the refractive index medium constituting a first period structure are changed, the propagation constant β of the waveguide unit 12 is changed, and a coupling condition to the second period structure of the emission unit 13 is changed. As a result, the emission angle θ of the emission beam is changed.

The light of the surface diffraction grating is radiated not only in an upper diagonal direction, but also in a lower diagonal direction. The light deflection device has a structure asymmetrical in upper and lower directions. Therefore, the light beams with the completely same strengths are not radiated, but are radiated in the lower diagonal direction. FIG. 7(b) shows the radiation in the upper diagonal direction as upward diffracted light, and the radiation in the lower diagonal direction as downward diffracted light.

The beam deflector 2 may be configured to include a reflection unit below the lower clad 12c. FIGS. 7(c) and 7(d) show a constitution example having a reflection unit.

The constitution example shown in FIG. 7(c) shows that a high refractive index medium such as Si is provided as a substrate of the structure. Here, the downward reflected light is reflected on a boundary face between the lower clad 12c and the high refractive index substrate 14, and is returned in the upper diagonal direction. When the thickness of the lower clad 12c is optimized to cause interference for strengthening the reflected light and the light emitted in the upper diagonal direction in advance by each other, the radiation in the upper diagonal direction can be entirely strengthened. The constitution example shown in FIG. 7(d) shows that a reflection mirror 16 such as a metal reflection mirror or a multi-layer membrane reflection mirror is inserted between the substrate 15 and the lower clad 12c, so as to further improve the radiation in the upper diagonal direction.

Slow Light Structure by Photonic Crystal

Figure 8:
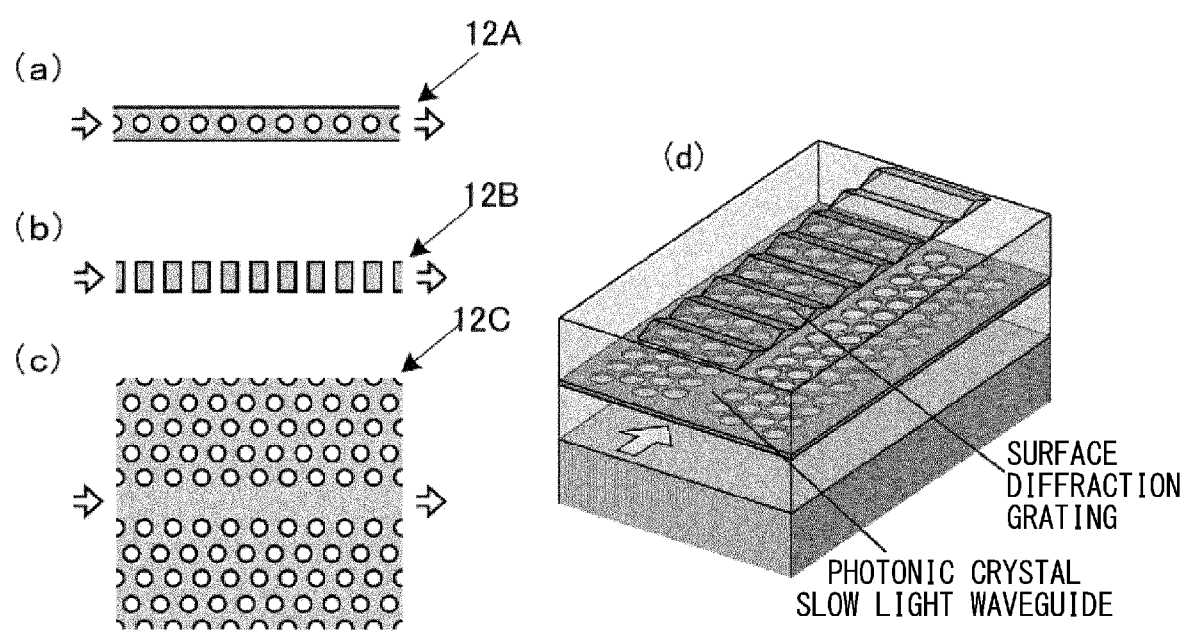
FIG. 8 is a drawing for explaining the light deflection device by the leakage waveguide according to the prevent invention.

Then, the slow light structure by the photonic crystal, and the constitution example of the slow light waveguide and the diffraction grating will be explained using FIG. 8. Here, such an example is shown that the first refractive index medium is a high refractive index medium and the second refractive index medium is a low refractive index medium.

A photonic crystal waveguide can be thought as an example of the first period structure for generating the slow light. FIGS. 8(a)-8(d) show the first period structure example by the photonic crystal waveguide, FIGS. 8(a) and 8(b) show a one-dimensional photonic crystal waveguide, and FIG. 8(c) shows a two-dimensional photonic crystal waveguide.

The one-dimensional photonic crystal waveguide 12A in FIG. 8(a) is a constitutional example in which circular holes are periodically aligned on a rectangular channel waveguide (such as a Si thin wire) made of the high refractive index medium such as a semiconductor, and the one-dimensional photonic crystal waveguide 12B in FIG. 8(b) is a constitutional example in which rectangular channel waveguides of the high refractive index medium are periodically separated.

In this constitution, a photonic band gap (stop band) is generated near a Bragg wavelength satisfying a=λ/2, and dβ/dλ, which is in direct proportion to $n_g$, is gradually made larger at a normalized frequency a/λ near it, so as to generate slow light.

In the case of a circular hole alignment type, for example, thickness of Si to λ≈1550 nm can be about 200 nm, width can be about 400 nm, a diameter of a circular hole can be about 200 nm, and period a can be about 400 nm.

The two-dimensional photonic crystal waveguide 12C in FIG. 8(c) has such a constitution that similar circular holes are two-dimensional periodically aligned, for example, in a triangle grating alignment on a semiconductor (Si and the like) slab with the similar thickness, and the circular holes in one row of the alignment are removed. In the structure of the two-dimensional photonic crystal waveguide 12C, the photonic band gap is generated near the Bragg wavelength, and the (group) refractive index $n_g$ is made large, so as to generate the slow light.

In any structure of the one-dimensional photonic crystal waveguide and the two-dimensional photonic crystal waveguide, a large slow light effect of $n_g$>100 is generated at the Bragg wavelength, and $n_g$ becomes gradually smaller as it is away from the Bragg wavelength. Also, the larger $n_g$ can be maintained in a wider wavelength range on the two-dimensional photonic crystal waveguide than on the one-dimensional photonic crystal waveguide.

FIG. 8(d) is a perspective view showing the two-dimensional photonic crystal waveguide sandwiched between silica clads. In this constitution example, a surface diffraction grating in a second period structure is formed on the surface of the two-dimensional photonic crystal waveguide on which the silica clads are formed. By adjusting the thickness of the clad between the two-dimensional photonic crystal waveguide and the surface diffraction grating, a degree of coupling the waveguide and the grating can be changed, so as to obtain light radiation at a proper speed.

Constitution of Two-Dimensional Sweeping of Light Deflection Device

The constitution for two-dimensionally sweeping emission light beams will be explained using FIGS. 9 and 10 as follows.

Figure 9:
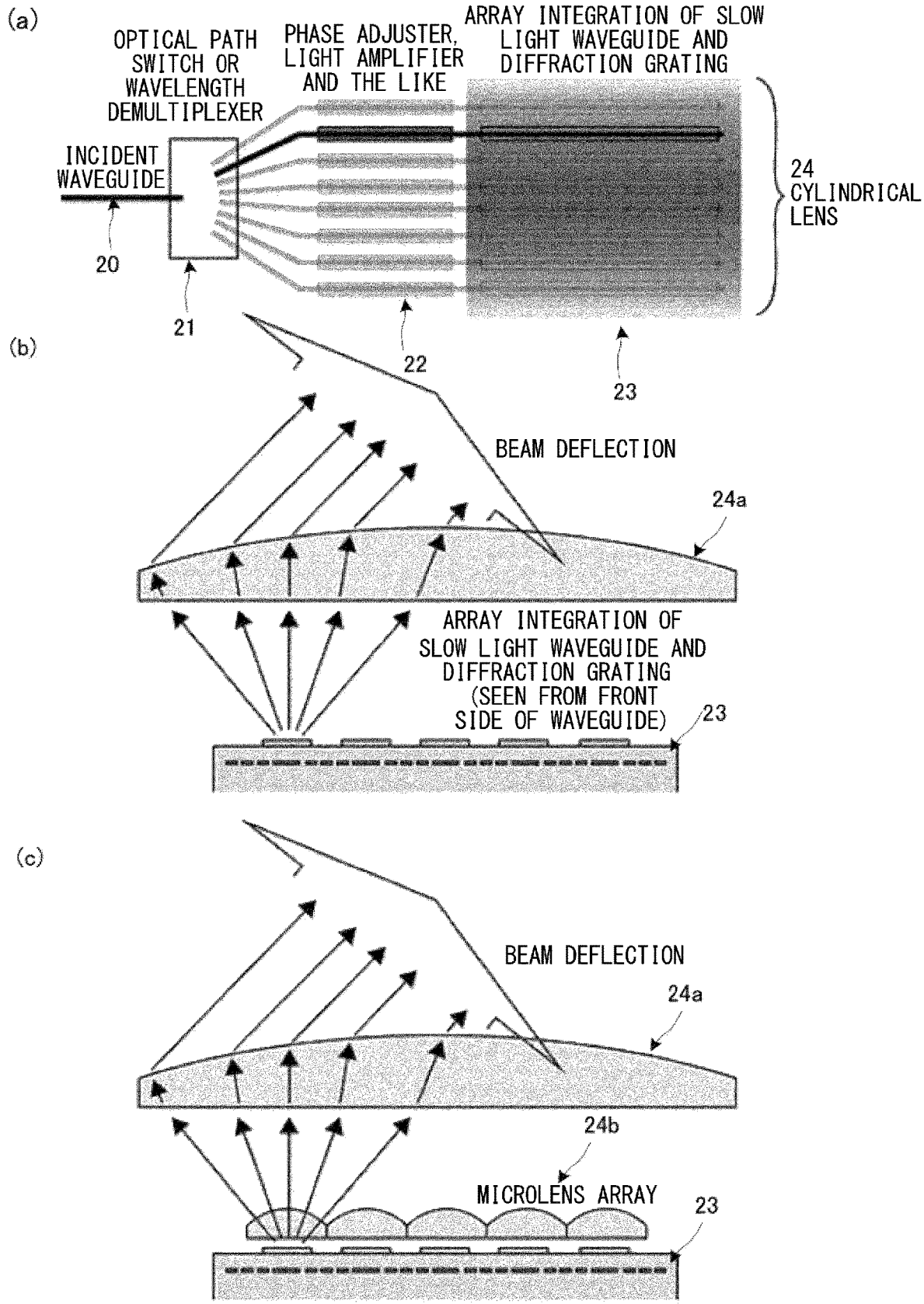
FIG. 9 is a drawing for explaining two-dimensional scanning of the light deflection device according to the present invention.
Figure 10:
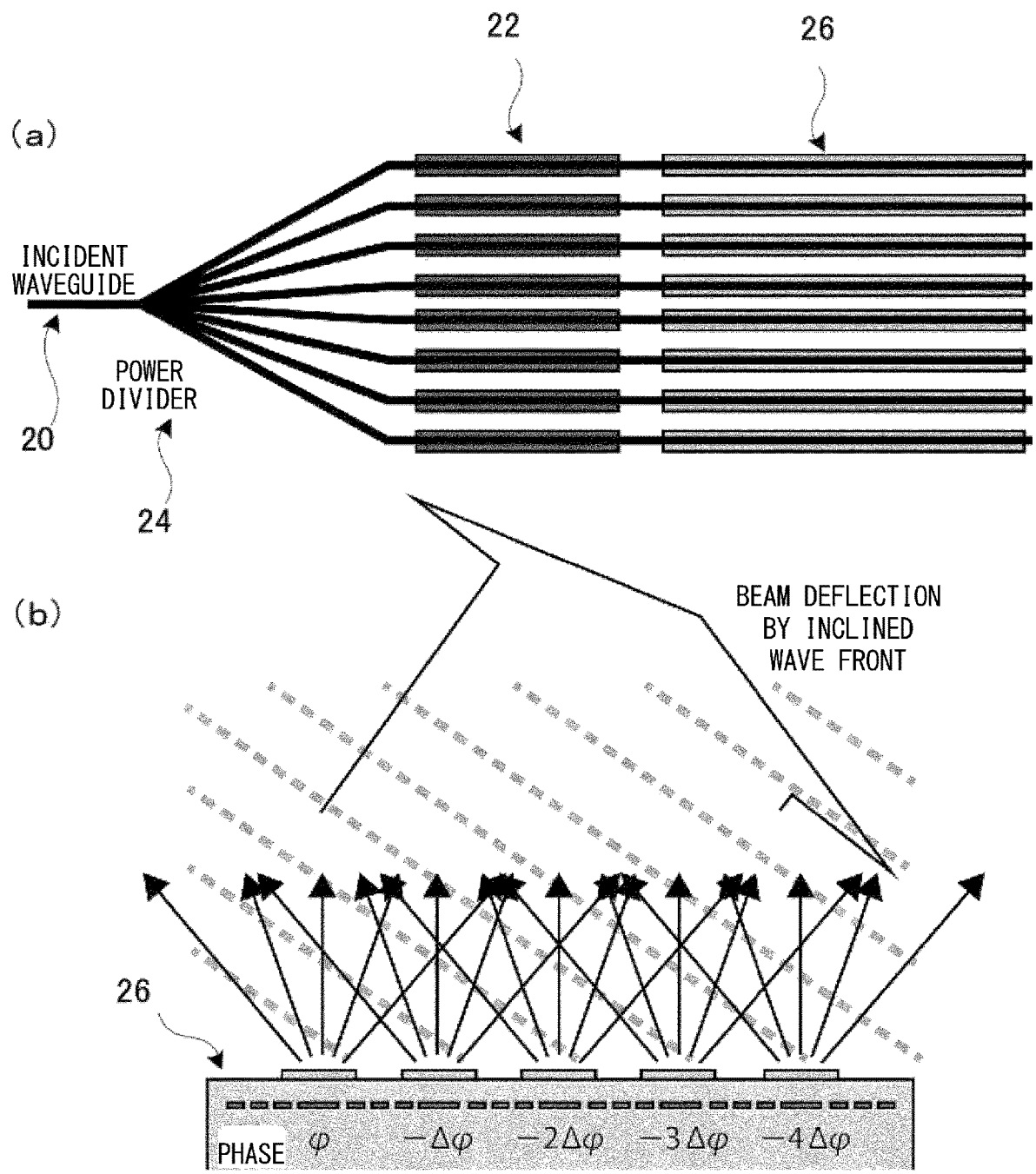
FIG. 10 is a drawing for explaining two-dimensional scanning of the light deflection device according to the present invention.

FIG. 9 shows a constitution for two-dimensionally sweeping beams by combination of an array constitution of the slow light waveguide and a cylindrical lens.

In FIG. 9(a), a large number of slow light waveguides and diffraction gratings are parallelly arranged to constitute an array integration 23, and a cylindrical lens 24 is arranged in an emission direction on an emission side of the array integration 23. An optical amplifier and a phase adjuster 22 are connected to each slow light waveguide. A switching unit 21 is connected to the phase adjuster 22, and the slow light waveguide for switching the light from the waveguide 20 and receiving the light by the switching unit 21 is selected. After the phase is adjusted by the phase adjuster 22, the light is received in the selected slow light waveguide. An optical path switching light switch or a wavelength demultiplexer can be used for the switching unit 21.

By selecting one of the slow light waveguides by the switching unit 21, the incident light from the waveguide 20 is emitted from any slow light waveguide. At that time, as shown in FIG. 9(b), a relative position of the emission beam to the cylindrical lens 24a is changed, so that an angle, in a cross section, of the emission beam emitted from the cylindrical lens 24a is changed.

When the waveguide is thin, the enlargement of the emitted light becomes especially large. At that time, as shown in FIG. 9(c), a small cylindrical lens array 24b is first arranged on each diffraction grating, so as to restrain the enlargement of the radiated light and then the light is made incident on a large cylindrical lens 24a. In this constitution, the same function as in FIG. 9(b) can be realized.

This constitution is designed so that the emission angle θ of the emission beam on each slow light waveguide can be changed according to the wavelength by sequentially switching the waveguide by the wavelength demultiplexer while continuously sweeping the wavelengths of the incident light in a wide range, or by sequentially switching the waveguide by the optical path switch for the light with wavelength that changes in time-series. By this constitution, the two-dimensional light beam angle sweeping can be realized.

Instead of the sweeping of the wavelength of the incident light, when the waveguide is switched with the light switch by a heater or a p-n junction, and the emission angle θ of the emission beam from the slow light waveguide is changed by the heater or the p-n junction, a similar effect can be obtained.

A constitution in which the slow light waveguide is switched by the wavelength demultiplexer and the emission beam is deflected by the heater or the p-n junction, as well as a constitution that the slow light waveguide is switched by the heater or the p-n junction and the emission beam is deflected by the wavelength demultiplexer may be used.

FIG. 9(a) shows a constitution for selecting one waveguide in a waveguide array. In the constitution example shown in FIG. 10, the phase adjuster 22 is connected to the array integration 26 in which the heaters or the p-n junctions with different lengths are provided on the slow light waveguide arranged in an array form, the incident light from the waveguide 20 is distributed to each waveguide via a power divider 25, and each distribution light is phase-adjusted, and then is received in the slow light waveguide.

The array integration 26 constitutes a phase array in which the light is received in all slow light waveguides and the phase is gradually made different and changed. By this constitution, the sharp beam radiation and the change of the deflection angle due to the phase change can be realized. In this phase array constitution, the emission beams are formed by simultaneously emitting the plural light with different phases, and therefore, there is no need of a cylindrical lens.

The power distribution of the incident light in FIG. 10(a) is strong at a center waveguide, gradually becomes weak toward peripheral waveguides. When an envelope of the power distribution is made to depend on Gaussian distribution, the quality of the emission beam formed after radiation is particularly improved. The constitutional example of such distribution may be a constitution used for an array waveguide diffraction grating, that is, a constitution in which the light on the incident waveguide is once connected to a wide slab waveguide and freely propagated inside it so that the light has the Gaussian distribution, and a desired number of array waveguides are connected to a terminal of the slab waveguide.

FIG. 10(b) shows a cross section structure example of the array integration 26. The array integration 26 constitutes the phase array by providing the heaters or the p-n junctions with the different lengths on the slow light waveguides arranged in array are provided in array.

The constitution example of the wavelength multiplexer/demultiplexer will be explained using FIG. 11.

Figure 11:
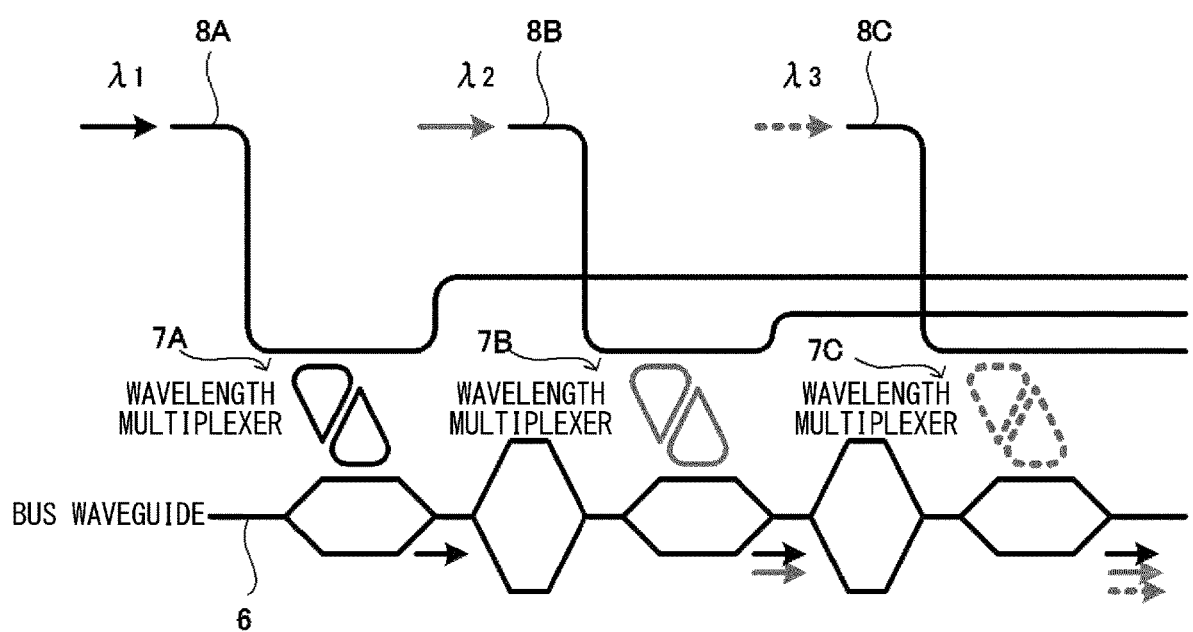
FIG. 11 is a drawing for explaining an example of a wavelength multiplexer/demultiplexer.
Figure 12:
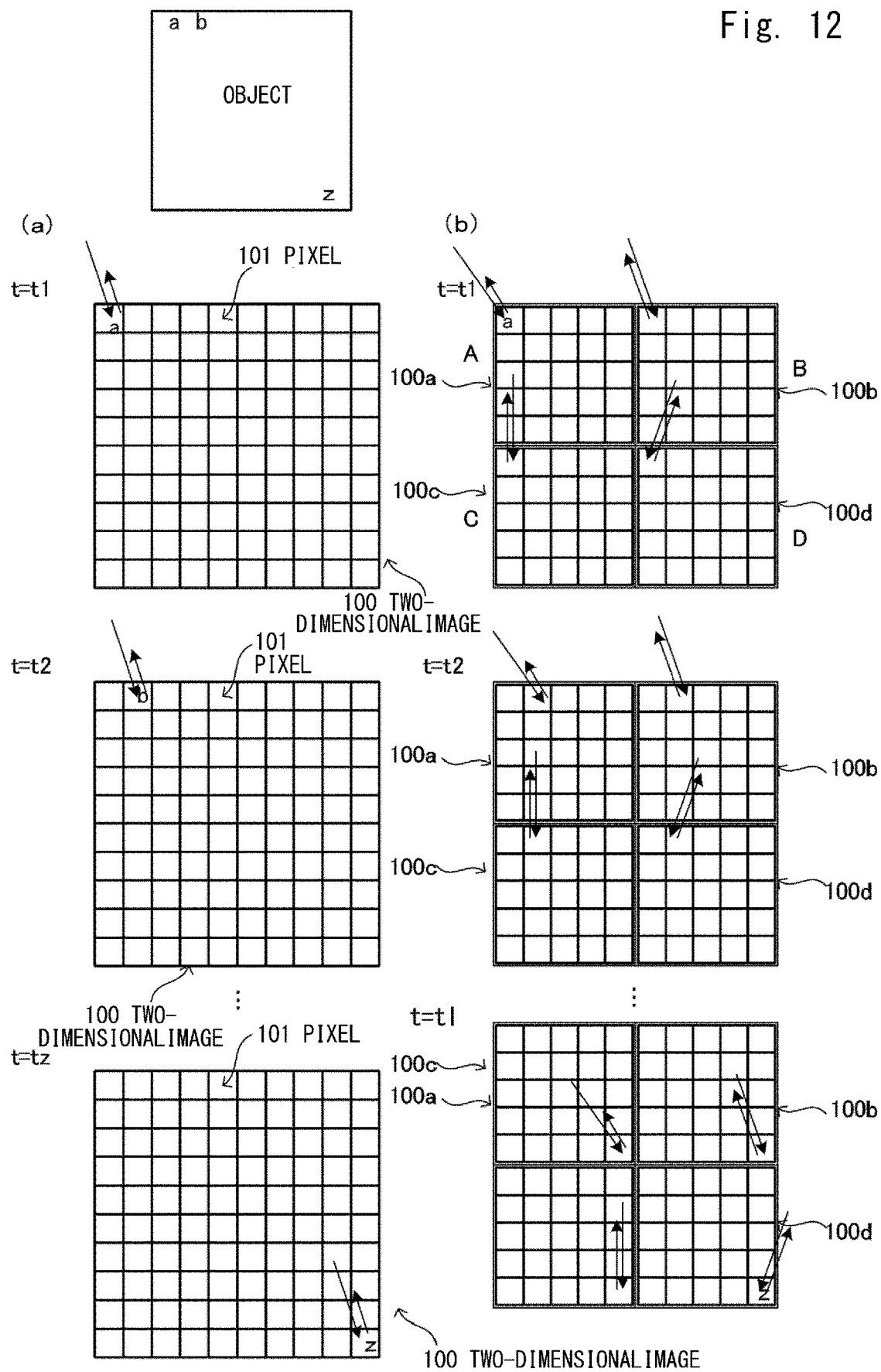
FIG. 12 is a drawing for explaining acquisition of information of one frame of an image.

FIG. 11 shows an example of the wavelength multiplexer/demultiplexer 7 using a triangle type coupling micro-ring oscillator. In the wavelength multiplexer/demultiplexer 7, plural ring waveguides arranged in a narrow area of about 10 μm square and coupled to each other form a box-shaped drop spectrum, which is a drop-shaped frequency are with this frequency characteristic. A drop-shaped frequency area with this frequency characteristic is made to be a passage area, so as to constitute the wavelength multiplexer/demultiplexer for multiplexing/demultiplexing the light beam(s) in a specific wavelength area to the bus waveguide. Also, an adequately wide drop spectrum is designed, so that a stable multiplexing/demultiplexing characteristic can be secured by providing a fine wavelength change Δλ.

In this constitution, a light modulator (not shown) may be provided on the waveguide 8, and can be used as a signal generation unit of a Frequency Modulation Continuous Wave (FMCW) type lidar device using a frequency light modulator.

The present invention is not limited to the above-mentioned embodiments. The present invention can be variously deformed or changed within the gist of the present invention, and such deformation or changes shall not be excluded from the scope of the present invention.

INDUSTRIAL APPLICABILITY

The light deflection device and the lidar device (laser radar) according to the present invention can be mounted to an automobile, a drone, a robot and the like, and can be applied to a 3D scanner mounted to a personal computer or a smartphone for quickly taking peripheral environments, a monitoring system, a space matrix light switch for light-exchange or a data center, and the like.

REFERENCE SIGNS LIST 1, 1A-1F light deflection device
2, 2A, 2B, 2C beam deflector
3, 3A-3C laser source
4, 4A-4C waveguide
5, 5A-5C light detector
6 bus waveguide
7, 7A, 7B wavelength multiplexer/demultiplexer
8, 8A, 8B, 8C waveguide
9 light switch
10, 10A-10D lidar device
11 pulse light source/light detection unit
12 waveguide unit
12A-12C dimensional photonic crystal waveguide
12a slow light waveguide
12b upper clad
12c lower clad
13 emission unit
13a surface diffraction grating
14 high refractive index substrate
15 substrate
16 reflection mirror
20 waveguide
21 switching unit
22 phase adjuster
23 array integration
24 cylindrical lens
24a cylindrical lens
24b cylindrical lens array
25 power divider
26 array integration
100 two-dimensional image
100a-100d block
101 pixel

The invention claimed is:

1. A light deflection device comprising:
a beam deflector made of a silicon photonics slow light structure having a deflection angle that has dependency on a wavelength and a refractive index; and
a laser source for emitting plural laser beams with different wavelengths,
wherein the beam deflector simultaneously and parallelly emits and deflects laser beams with respective wavelengths emitted from the laser source in directions of deflection angles each defined by a wavelength of each laser beam and the refractive index of the beam deflector.

2. The light deflection device according to claim 1, further comprising a wavelength multiplexer/demultiplexer between the laser source and the beam deflector, wherein the wavelength multiplexer/demultiplexer wavelength-multiplexes the laser beams with the respective wavelengths from the laser source.

3. The light deflection device according to claim 1, wherein the beam deflector is a leakage waveguide having a surface diffraction grating, or a multi-layer membrane structure or surface diffraction grating.

4. A lidar device comprising:
a light deflection device according to claim 1;
a laser source for emitting plural laser beams with different wavelengths; and
a light detection unit for individually detecting the laser beams,
wherein, in the light deflection device, the beam deflector, and a receiver for selectively, simultaneously and parallelly receiving laser beams each having an incident angle that is a deflection angle among the laser beams with the respective wavelengths reaching from outside are constituted by the same element or separate elements, and
the light detector individually detects the laser beams with the respective wavelengths each received in the receiver at an incident angle that is the same angle as each deflection angle of the laser beams emitted by the beam deflector.

5. The lidar device according to claim 4, further comprising a wavelength multiplexer/demultiplexer between the laser source and the beam deflector, and/or between the beam deflector and the detector,
wherein the wavelength multiplexer/demultiplexer wavelength-multiplexes the laser beams with the respective wavelengths emitted from the laser source, and/or wavelength-demultiplexes the received laser beam with the respective wavelengths into individual laser beams with respective wavelengths.

6. The lidar device according to claim 4, wherein the beam deflector is a leakage waveguide having a surface diffraction grating, or a multi-layer membrane structure or surface diffraction grating.

7. The lidar device according claim 4, wherein the beam deflector is a single body for deflecting a light beam with each wavelength of the respective wavelengths using one element, or a complex body in which plural elements for individually deflecting a light beam with each wavelength of the respective wavelengths are aligned in array.

8. The light deflection device according to claim 1, wherein the refractive index of the beam deflector is variable.

9. The light deflection device according to claim 1, wherein the beam deflector is a single body for deflecting a light beam with each wavelength of the respective wavelengths using one element, or a complex body in which plural elements for individually deflecting a light beam with each wavelength of the respective wavelengths are aligned in array.

* * * * *